(12) United States Patent
Schnoelzer et al.

(10) Patent No.: US 9,702,274 B2
(45) Date of Patent: Jul. 11, 2017

(54) CAM CARRIER ASSEMBLY FOR AN INTERNAL COMBUSTION ENGINE

(71) Applicant: GM GLOBAL TECHNOLOGY OPERATIONS LLC, Detroit, MI (US)

(72) Inventors: Daniel Schnoelzer, Riedstadt (DE); Robert Wartanian, Riedstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 14/447,429

(22) Filed: Jul. 30, 2014

(65) Prior Publication Data
US 2015/0034030 A1 Feb. 5, 2015

(30) Foreign Application Priority Data
Jul. 30, 2013 (GB) .................................. 1313584.3

(51) Int. Cl.
*F01L 1/047* (2006.01)
*F01L 1/053* (2006.01)
*G01M 15/04* (2006.01)

(52) U.S. Cl.
CPC ........... *F01L 1/047* (2013.01); *G01M 15/046* (2013.01); *F01L 2001/0471* (2013.01); *F01L 2001/0537* (2013.01); *F01L 2103/01* (2013.01); *F01L 2103/02* (2013.01); *Y10T 29/49231* (2015.01); *Y10T 74/2101* (2015.01)

(58) Field of Classification Search
CPC ............................ F01L 1/047; F01L 2013/111
USPC .............................................. 123/90.38, 90.6
See application file for complete search history.

(56) References Cited

U.S. PATENT DOCUMENTS

| 8,065,983 B2 * | 11/2011 | Smith ..................... F02F 7/006 123/195 C |
| 2007/0017282 A1 * | 1/2007 | Tooyama ................ F01L 1/053 73/114.26 |
| 2012/0000436 A1 | 1/2012 | Schneider et al. |
| 2012/0024244 A1 * | 2/2012 | Wotherspoon .......... F01L 1/047 123/90.1 |

FOREIGN PATENT DOCUMENTS

| DE | 102012202291 A1 * | 8/2013 | ............. G01D 5/147 |
| EP | 1283337 A2 | 2/2003 | |
| EP | 2194240 A1 | 6/2010 | |
| GB | 2494110 A | 3/2013 | |
| GB | 2494156 A | 3/2013 | |

* cited by examiner

*Primary Examiner* — Mark Laurenzi
*Assistant Examiner* — Paul Thiede
(74) *Attorney, Agent, or Firm* — Lorenz & Kopf LLP

(57) ABSTRACT

A camshaft assembly includes a cam carrier and a camshaft that is rotatable relative to the cam carrier in a first configuration and fixed against rotation in a second configuration. The assembly further includes a cam target wheel that includes notches, a first and second half-wheel, and a groove. The assembly additionally includes a camshaft position sensor holder that includes a camshaft sensor bore that provides access to the groove. Also, the assembly includes a camshaft position sensor received in the camshaft sensor bore in the first configuration. Moreover, the assembly includes a locking mechanism received in the camshaft sensor bore in the second configuration. The locking mechanism includes an engagement member configured to selectively engage the groove for locking the camshaft into position relative to the cam carrier.

8 Claims, 5 Drawing Sheets

CAM CARRIER ASSEMBLY FOR AN INTERNAL COMBUSTION ENGINE

CROSS REFERENCE TO RELATED APPLICATION

This application claims priority to GB Patent Application No. 1313584.3 filed Jul. 30, 2013, which is incorporated herein by reference in its entirety.

TECHNICAL FIELD

The technical field relates to a cam carrier assembly for an internal combustion engine.

BACKGROUND

An internal combustion engine for a motor vehicle generally includes an engine block, which defines at least one cylinder accommodating a reciprocating piston, coupled to rotate a crankshaft. The cylinder is closed by a cylinder head that cooperates with the reciprocating piston to define a combustion chamber. A fuel and air mixture is cyclically disposed in the combustion chamber and ignited, thereby generating hot expanding exhaust gasses that cause the reciprocating movements of the piston. The fuel is injected into each cylinder by a respective fuel injector. The fuel is provided at high pressure to each fuel injector from a fuel rail in fluid communication with a high-pressure fuel pump that increases the pressure of the fuel received from a fuel source.

Each of the cylinders has at least two valves that selectively allow air into the combustion chamber from an intake port and alternately allow exhaust gases to exit through an exhaust port. Each of the valves of each cylinder is actuated by a respective cam rotating on camshafts in time with the crankshaft and being connected to the crankshaft by a series of pulleys and a belt or a chain.

Conventional internal combustion engines are also managed by an Electronic Control Unit (ECU) that may receive input signals representative of various physical parameters associated with the engine from various sensors and may execute suitable calculations to determine the relevant physical parameters of each fuel injection.

Among these sensors, a camshaft sensor is provided on one of the camshafts. The sensor is used in combination with a crankshaft sensor to monitor the opening and closing of the valves in relation with the position of the pistons and valves in the engine, especially but not exclusively in engines with variable valve timing.

The camshaft position sensor may be used in combination with a rotating cam target wheel provided with a series of notches on its circumference. The camshaft position sensor may detect a series of notches located on the cam target wheel as they pass in front of the sensor position during rotation of the camshaft. The camshaft sensor may be a Hall effect device or may be based on other detection principles such as an optical sensor or an inductive sensor.

In conventional internal combustion engines, the camshafts have to be installed in a cam carrier by inserting them through bearings provided in seats in the cam carrier while the cam target wheel is machined or already installed on one of the camshafts. In this case, the diameter of the target wheel of the camshaft is limited by the diameter of the bearings, because the camshaft must be moved through the bearings during assembly of the engine. However, a small target wheel diameter leads to a low or to a not optimal accuracy of the cam sensor output signal.

Furthermore, since the camshafts and the crankshaft must be synchronized together, during assembly of the engine, an intermediate locking phase of the camshafts is provided where the camshafts, once inserted into the cam carrier, must be temporarily locked into a fixed position to allow the synchronization with the crankshaft and the pistons of the engine. In order to perform this locking operation, current camshafts have a groove that is machined on their surface and cam carriers are provided with a lateral bore through which the camshaft is locked in place by a special tool that can be inserted into the bore in order to engage the groove.

SUMMARY

The present disclosure provides an improvement in the accuracy of the cam target wheel without the need of performing major design changes on the engine, which is a simple, rational and rather inexpensive solution.

An embodiment of the present disclosure provides a cam target wheel for a camshaft of an internal combustion engine. The cam target wheel includes a first and a second half-wheel, each being provided with connecting means for their reciprocal connection. An advantage of this embodiment is that it allows the use of a cam target wheel whose diameter is not limited by the diameter of the bearings of the cam carrier because the cam target wheel can be mounted on the camshaft after the camshaft has been inserted in the cam carrier. A larger diameter of the cam target wheel improves the accuracy of the cam sensor output signal.

According to another embodiment of the present disclosure, the half-wheels connecting means include bolts screwed into respective threaded holes of the half-wheels. An advantage of this embodiment is that it allows an easy assembly of the cam target wheel on the camshaft.

According to another embodiment of the present disclosure, the cam target wheel includes a groove in a circumferential portion thereof. An advantage of this embodiment is that it avoids performing an operation of machining of a groove in the camshaft.

According to another embodiment of the present disclosure, a cam carrier for housing a camshaft assembly is provided. The cam carrier includes a cam cover and a camshaft position sensor holder in the cam cover. The camshaft position sensor holder includes a bore suitable for housing a locking tool to engage the groove of the cam target wheel. An advantage of this embodiment is that it avoids to perform an operation of machining of a separate bore and thread in the cam carrier.

According to another embodiment of the present disclosure, the camshaft position sensor holder in the cam carrier is associated with a housing for a cam sensor bolt. The cam sensor bolt is suitable for locking into position the locking tool. An advantage of this embodiment is that the locking tool can be positioned using the already present structure of the camshaft position holder. Furthermore, only a simple tool is required to lock the camshaft, because the tool can be fixed with the cam sensor bolt.

Another embodiment of the present disclosure provides a method of mounting a camshaft assembly in a cam carrier of an internal combustion engine, the method including the steps of inserting a camshaft through bearings provided in seats of the cam carrier; mounting a first half-wheel of the cam target wheel on the camshaft; rotating the camshaft by 180° and mounting the second half-wheel of the cam target wheel on the camshaft; connecting together the first half-wheel and the second half-wheel. An advantage of this embodiment the camshaft assembly is mounted in a simple and straightforward manner while, at the same time, benefitting from a larger cam target wheel, therefore improving accuracy of the sensor.

Still another embodiment of the present disclosure provides temporarily locking the mounted camshaft into a fixed position by a locking tool inserted into the bore of the camshaft position sensor holder until a tip of the locking tool engages in the groove of the cam target wheel. An advantage of this embodiment is that it allows locking temporarily the camshaft assembly without the need of any machining in a lateral side of the cam cover.

BRIEF DESCRIPTION OF THE DRAWINGS

The present disclosure will hereinafter be described in conjunction with the following drawing figures, wherein like numerals denote like elements.

DETAILED DESCRIPTION

Exemplary embodiments will now be described with reference to the enclosed drawings without intent to limit application and uses.

Figure 1:
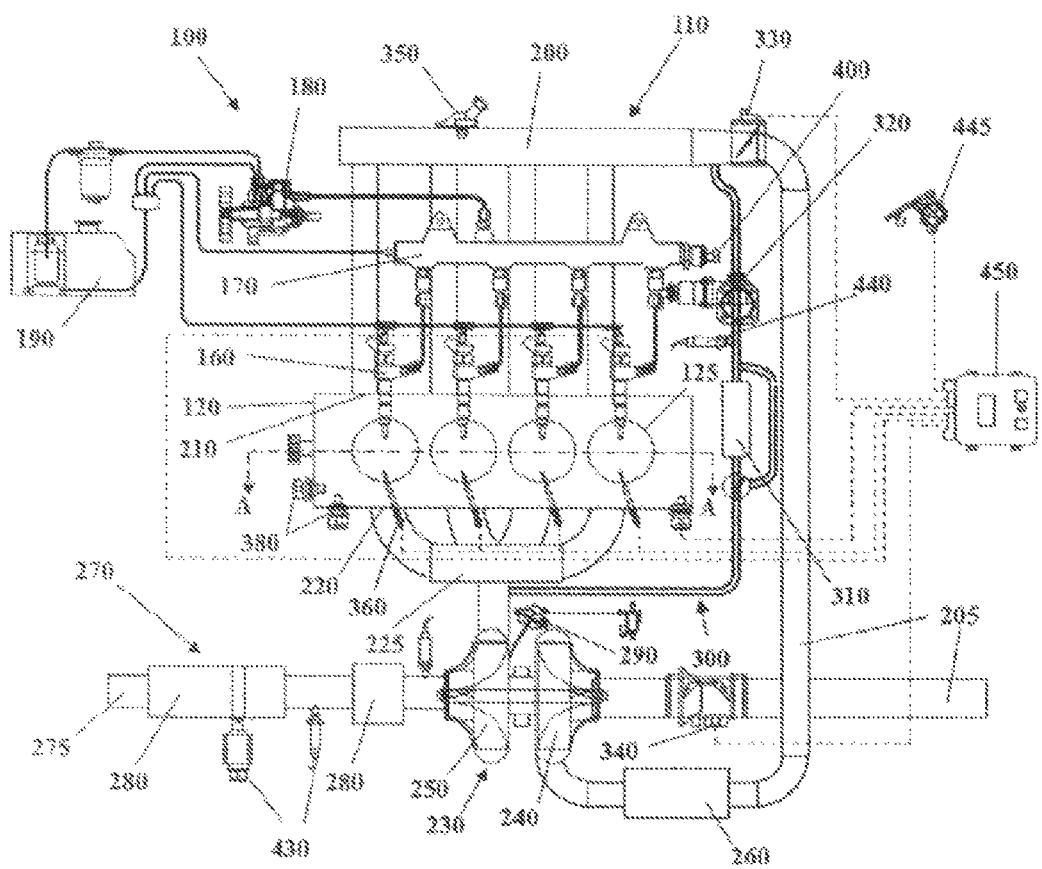
FIG. 1 shows an automotive system.
Figure 2:
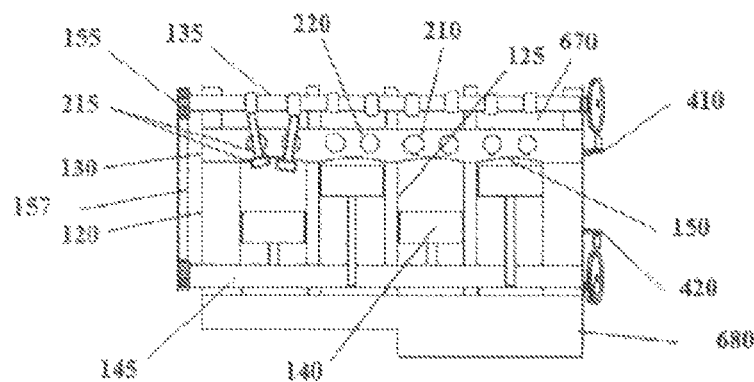
FIG. 2 is a cross-section of an internal combustion engine belonging to the automotive system of FIG. 1.
Figure 3:
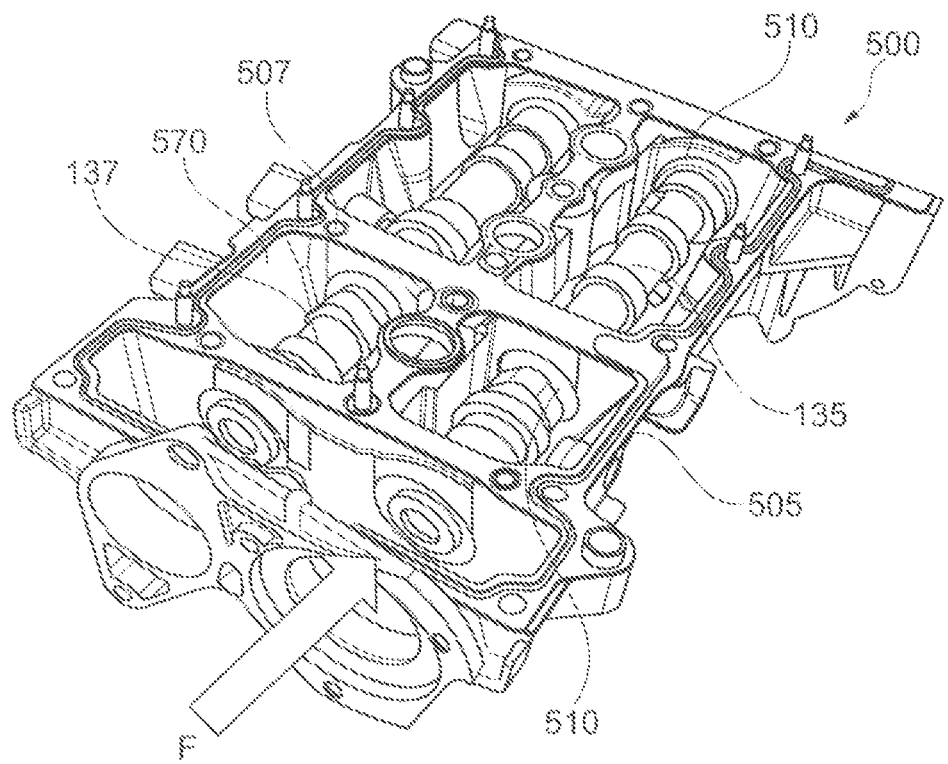
FIGS. 3 and 4 represent a bottom and top portion of a cam carrier according to the prior art.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145, the crankshaft 145 being housed in a crankcase 680. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increase the pressure of the fuel received from a fuel source 190. Each of the cylinders 125 has at least two valves 215, actuated by a camshafts 135,137 rotating in time with the crankshaft 145. The valves 215 selectively allow air into the combustion chamber 150 from the port 210 and alternately allow exhaust gases to exit through a port 220. Since the valves 215 control the flow of the air/fuel mixture intake and exhaust gases, they must be opened and closed at the appropriate time during the stroke of the piston 140. For this reason, the camshafts 135,137 are connected to the crankshaft 145 either directly via a gear mechanism or indirectly via a belt or chain 157. In some examples, a cam phaser 155 may selectively vary the timing between the camshafts 135,137 and the crankshaft 145. A space in which the camshafts 135,137 are housed is defined as a camshaft ambient 570 (FIG. 3).

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230 having a compressor 240 rotationally coupled to a turbine 250 may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after treatment devices 280. The after treatment devices 280 may be any device configured to change the composition of the exhaust gases. Some examples of after treatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Figure 4:
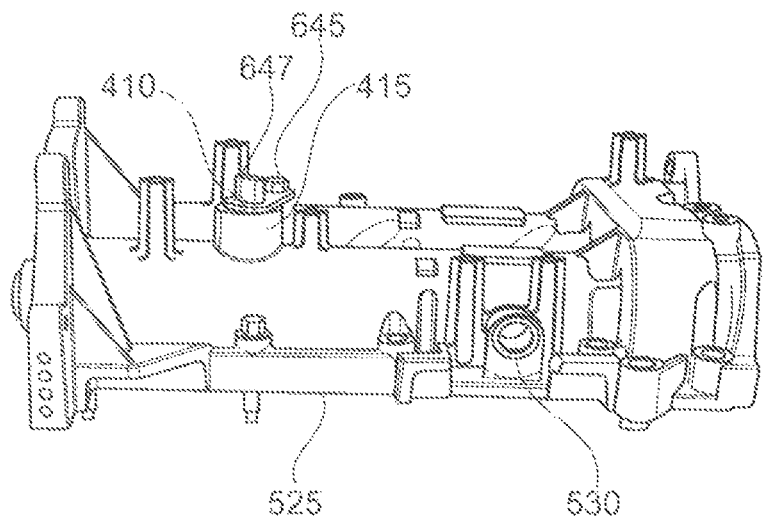

More specifically, FIG. 3 shows a schematic illustration of a cam carrier according to the prior art, globally indicated with the reference number 500. The cam carrier 500 includes a bottom portion 505 cooperating with a cam cover 525 (FIG. 4) to define a camshaft ambient 570 in which camshafts 135,137 are housed. The bottom portion 505 has seats 507 for the camshafts 135,137. The seats 507 include bearings 510 into which the camshafts 135,137 are mounted by inserting them according to the direction of the arrow F of FIG. 3.

A camshaft position sensor 410 is located in a camshaft position sensor holder 415 having a camshaft sensor bore 647 for holding the sensor 410 and a housing 417 for a cam sensor bolt 645, the function of which will be explained in the following description. The camshaft position sensor holder 415 is located in the top of the cam cover 525 of the cam carrier 500. The cam cover 525 covers the bottom portion 505 of the cam carrier 500.

A camshaft locking bore 530 is provided in a lateral portion of the cam cover 525 of the prior art (FIG. 4) through which the camshaft 135 is temporarily locked in place by means of a special tool (not represented for simplicity) that can be inserted into the locking bore 530 in order to engage with a groove on the camshaft 135 to allow the synchronization with the crankshaft 145 and the pistons 140 of the engine 110.

Figure 5:
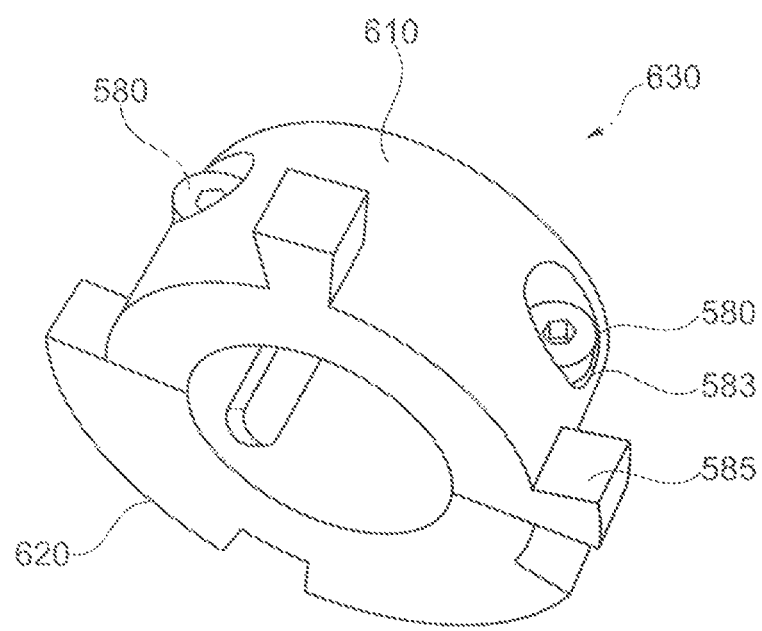
FIG. 5 represents a cam target wheel according to an embodiment of the present disclosure.
Figure 6:
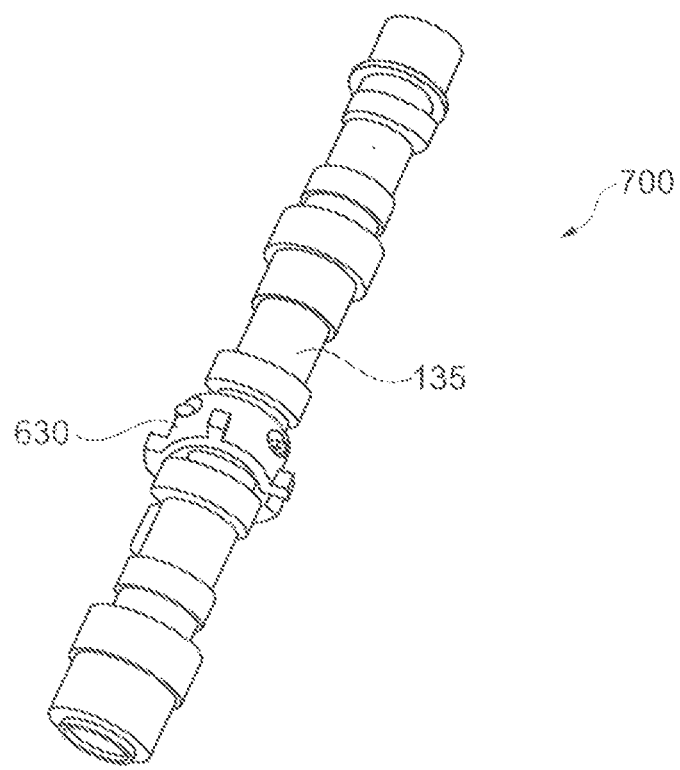
FIG. 6 represents a camshaft assembly including a camshaft equipped with a target wheel according to an embodiment of the present disclosure.

FIG. 5 illustrates a cam target wheel 630, according to an embodiment of the present disclosure. FIG. 6 illustrates a camshaft assembly 700 including a camshaft 135 equipped with the cam target wheel 630 of FIG. 5. The cam target wheel 630 includes two half-wheels 610,620 that may be connected by means of bolts 580 screwed into respective threaded holes 583 to form the cam target wheel 630. The threaded holes 583 may be machined in the half wheels 610,620 and have a depth that allows the bolts 580 to be hidden from the camshaft position sensor 410 in order not to interfere with its operation. Other threaded or non-threaded connecting means known in the art may be used without departing from the various embodiments of the present disclosure.

The cam target wheel 630 is provided with a series of notches 585 on its circumference, suitable to be sensed by a camshaft position sensor 410.

According to an embodiment of the present disclosure (FIG. 10) a groove 660 is provided in the cam target wheel 630. The groove 660 is provided in a circumferential portion 665 of the cam target wheel that is free of notches 585.

Figure 7:
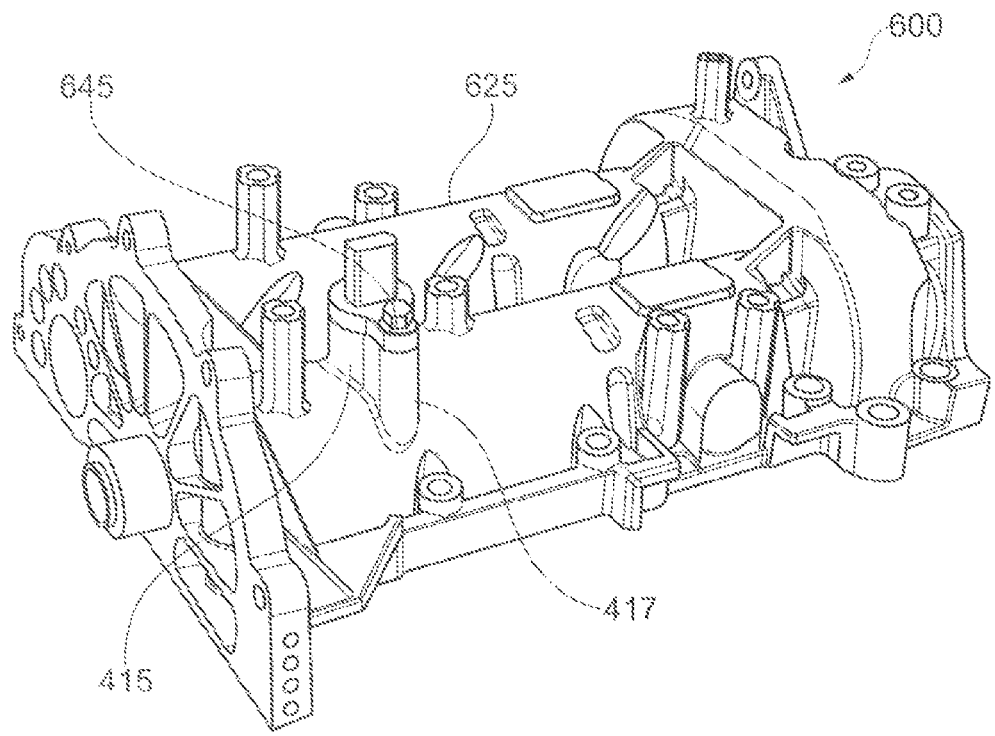
FIG. 7 represents a cam carrier according to an embodiment of the present disclosure.

FIG. 7 represents a cam cover 625 of a cam carrier 600 according to an embodiment of the present disclosure. The cam cover 625 has a camshaft position sensor holder 415.

Figure 8:
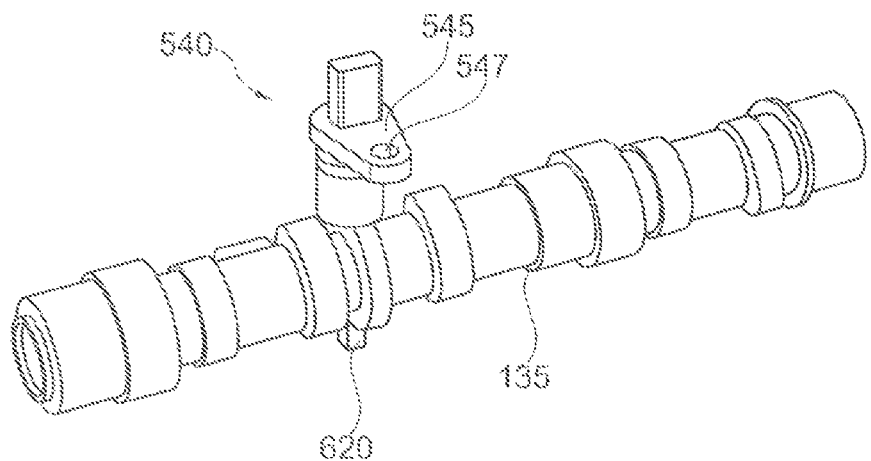
FIG. 8 represents a camshaft equipped with a target wheel according to an embodiment of the present disclosure and a cam sensor.

FIG. 8 represents a camshaft 135 equipped with a cam target wheel 620 according to an embodiment of the present disclosure and connected to a camshaft position sensor 540.

The camshaft position sensor 540 has a connection element 545 and a hole 547 in the connection element 545. The camshaft position sensor 540 is suitable to be inserted into the camshaft position sensor holder 415 and blocked into position by inserting the cam sensor bolt 645 into the hole 547 of the connection element 545 and then into the housing 417 for the cam sensor bolt 645. The camshaft position sensor 540 may detect the notches 585 located on the cam target wheel 630 as they pass in front of the sensor position during rotation of the camshaft 135 in order to determine the position of the cams.

Figure 9:
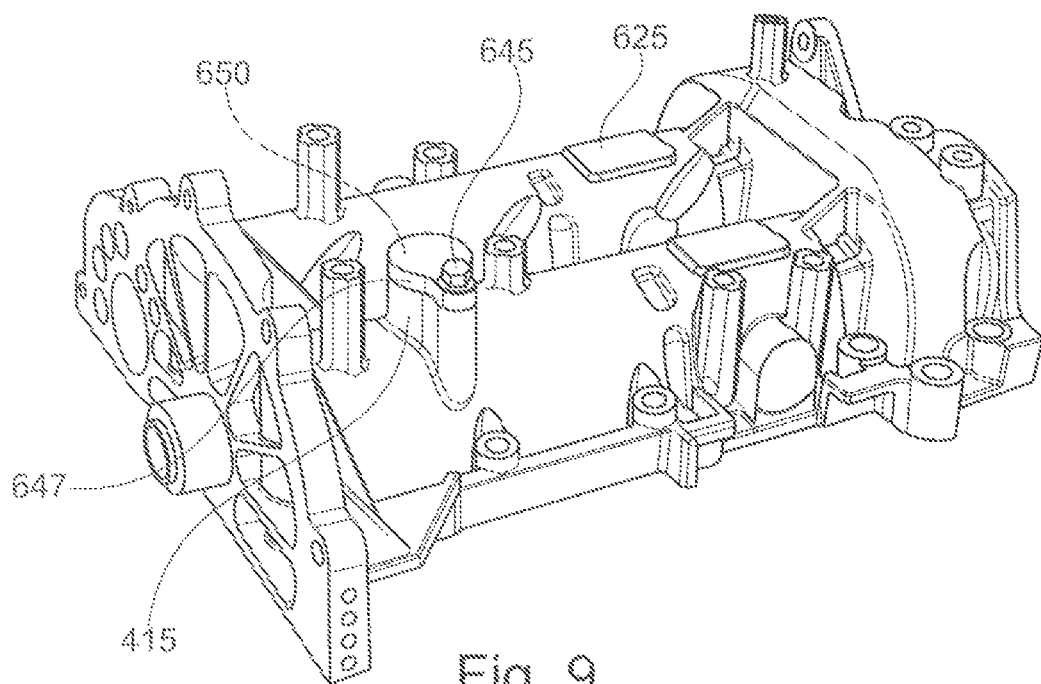
FIG. 9 represents a cam carrier according to an embodiment of the present disclosure and a locking tool to lock the camshaft.

FIG. 9 represents a cam cover 625 for a cam carrier 600 according to an embodiment of the present disclosure. The cam cover 625 is provided with a locking tool 650 to lock the camshaft 135. The locking tool 650 can be inserted into the camshaft sensor bore 647 of the camshaft sensor holder 415.

Figure 10:
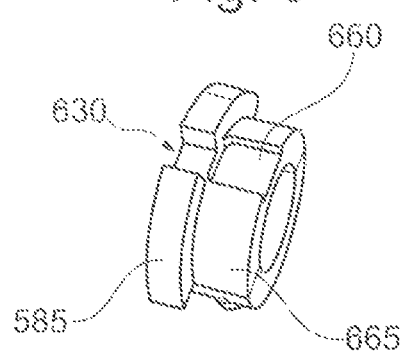
FIG. 10 represents a particular of a cam target wheel according to an embodiment of the present disclosure.

FIG. 10 represents a particular of a cam target wheel 630 according to an embodiment of the present disclosure in which groove 660 is provided. The groove 660 is provided in a circumferential portion 665 of the cam target wheel that is free of notches 585.

Figure 11:
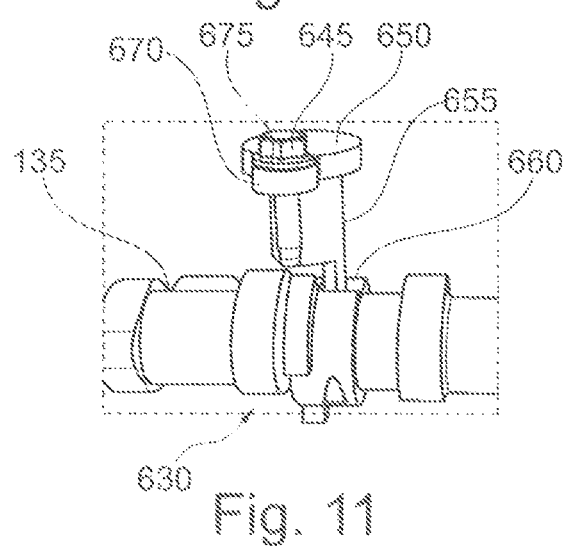
FIG. 11 represents a camshaft equipped with a target wheel according to an embodiment of the present disclosure and engaged by a locking tool.

FIG. 11 represents a camshaft equipped with a target wheel according to an embodiment of the present disclosure and engaged by the locking tool 650. The locking tool 650 being equipped with a tip 655 that engages in the groove 660 of the cam target wheel 630. The locking tool 650 is also provided with a connection element 670 having a hole 675 for the cam sensor bolt 645.

When the engine 110 is assembled, the camshafts 135 are inserted through the bearings 510. The first half-wheel 610 of the cam target wheel 630 is then inserted on the camshaft 135. The camshaft 135 is then rotated by 180° and the second half-wheel 620 of the cam target wheel 630 is mounted over the first half-wheel 610 and connected thereto by bolts 580. This mounting procedure allows for the use of a cam target wheel 630 having a larger diameter, not limited by the bearings 510 diameter, in order to improve the accuracy of the cam sensor output signal Since camshaft 135 has to be synchronized with the crankshaft 145, an intermediate locking phase of the camshafts is provided where the camshafts, once inserted into the cam carrier 600, must be temporarily locked into a fixed position to allow the synchronization with the crankshaft 145 and the pistons 140 of the engine 110. This operation may be executed by using the locking tool 650 which is inserted into the camshaft sensor bore 647 until the tip 655 of the locking tool 650 engages in the groove 660 of the cam target wheel 630 in order to lock the camshaft 135 into position. The locking tool 650 can be fixed into position by means of with the cam sensor bolt 645 without any additional fixing means (FIG. 9) in a similar fashion as the fixing in place of the camshaft position sensor 410. Once the intermediate locking phase is done, the locking tool 650 can be removed and the cam sensor 540 can be mounted in its place.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A camshaft assembly having a first configuration and a second configuration, the camshaft assembly comprising:
   a cam carrier;
   a camshaft that is supported by the cam carrier, the camshaft being rotatable relative to the cam carrier in the first configuration, the camshaft being fixed against rotation relative to the cam carrier in the second configuration;
a cam target wheel received on the camshaft and including:
a plurality of notches;
a first half-wheel and a second half-wheel, the first half-wheel and the second half-wheel being provided with a connector for their reciprocal connection; and
a groove positioned on a circumferential portion of the cam target wheel, the circumferential portion being free of the plurality of notches; and
a camshaft position sensor holder that includes a camshaft sensor bore that provides access to the groove;
a camshaft position sensor received in the camshaft sensor bore in the first configuration, the camshaft position sensor configured to detect the plurality of notches located on the cam target wheel as the plurality of notches passes in front of the camshaft position sensor; and
a locking mechanism received in the camshaft sensor bore in the second configuration, the locking mechanism including an engagement member configured to selectively engage the groove in order to lock the camshaft into position relative to the cam carrier.

2. The camshaft assembly according to claim 1, wherein the connector comprises at least one bolt screwed into a threaded hole formed in at least one of the the first half-wheel and the second half-wheel.

3. The camshaft assembly according to claim 1, wherein at least one of the first half-wheel and the second half-wheel has the groove formed in a circumferential portion thereof.

4. The camshaft assembly according to claim 1 further comprising a cam cover, the camshaft position sensor holder in the cam cover, the camshaft position sensor holder having the camshaft sensor bore formed therein and configured to receive the locking mechanism for engaging the groove formed in the cam target wheel.

5. An internal combustion engine in combination with the camshaft assembly of claim 1.

6. The camshaft assembly of claim 1, wherein the cam target wheel includes an opening between adjacent ones of the plurality of notches; and
wherein the groove is at least as wide in the circumferential direction as the opening.

7. The camshaft assembly of claim 1, wherein the engagement member is a tip of the locking mechanism configured to be selectively received within the groove to lock the camshaft into position relative to the cam carrier.

8. A method of mounting a camshaft assembly in a cam carrier of an internal combustion engine, the method comprising:
inserting a camshaft through bearings provided in seats of a cam carrier;
mounting a first half-wheel of a cam target wheel on the camshaft;
mounting a second half-wheel of the cam target wheel on the camshaft, wherein the cam target wheel includes a series of notches, the cam target wheel further including a groove positioned on a circumferential portion of the cam target wheel, the circumferential portion being free of the plurality of notches;
connecting together the first half-wheel and the second half-wheel, the first half-wheel and the second half-wheel being provided with a connector for their reciprocal connection;
inserting a locking tool into a bore of a camshaft position sensor holder until a tip of the locking tool engages in the groove of the cam target wheel to fix the camshaft against rotation relative to the cam carrier;
removing the locking tool from the bore to allow the camshaft to rotate relative to the cam carrier; and
inserting a camshaft position sensor into the bore after removing the locking tool, the camshaft position sensor configured to detect the plurality of notches located on the cam target wheel as the plurality of notches passes in front of the camshaft position sensor.

* * * * *